United States Patent [19]

Torii et al.

[11] Patent Number: 5,739,655
[45] Date of Patent: Apr. 14, 1998

[54] AMBULATORY ROBOT AND AMBULATION CONTROL METHOD FOR SAME

[75] Inventors: Tetsuo Torii, Yokosuka; Takuya Sakamoto; Mitsuo Hosoi, both of Hiratsuka; Tomoo Matsuda, Fujisawa, all of Japan

[73] Assignee: Kabushiki Kaisha Komatsu Seisakusho, Japan

[21] Appl. No.: 525,879

[22] Filed: Sep. 7, 1995

[30] Foreign Application Priority Data

Sep. 9, 1994 [JP] Japan .................................. 6-216225

[51] Int. Cl.⁶ .................................................. B62D 51/06
[52] U.S. Cl. ............................ 318/568.12; 318/568.2; 180/8.6; 395/82; 395/84; 305/1; 446/356
[58] Field of Search ................. 318/568.11, 568.12, 318/568.17, 568.18, 568.3, 587; 180/8.1–8.7; 280/5.2, 5.26, 28.5; 395/80, 82, 84; 901/1; 185/29, 40 R, 41 R; 446/353, 355, 356; 305/1–4

[56] References Cited

U.S. PATENT DOCUMENTS

| | | | |
|---|---|---|---|
| 979,447 | 12/1910 | Diplock | 305/2 |
| 1,762,574 | 6/1930 | Fox | 446/377 X |
| 2,292,298 | 8/1942 | Singer | 305/1 |
| 4,302,903 | 12/1981 | Pan | 185/7 |
| 4,365,437 | 12/1982 | Jameson | 180/80 |
| 4,530,672 | 7/1985 | Yoneda | 446/324 |
| 4,547,170 | 10/1985 | Gurtner et al. | 446/353 |
| 4,565,487 | 1/1986 | Kroczynski | 414/730 |
| 4,662,465 | 5/1987 | Stewart | 180/8.1 |
| 4,834,200 | 5/1989 | Kajita | 180/8.1 |
| 5,121,805 | 6/1992 | Collie | 180/8.1 |
| 5,124,918 | 6/1992 | Beer et al. | 901/1 X |
| 5,127,484 | 7/1992 | Bares et al. | 180/8.1 |
| 5,151,859 | 9/1992 | Yoshino et al. | 364/424.02 |
| 5,378,969 | 1/1995 | Haikawa | 318/568.12 |
| 5,423,708 | 6/1995 | Allen | 446/356 |
| 5,551,525 | 9/1996 | Pask et al. | 180/8.6 |
| 5,574,347 | 11/1996 | Neubauer | 318/568.12 |

*Primary Examiner*—Brian Sircus
*Attorney, Agent, or Firm*—Handal & Morofsky

[57] ABSTRACT

The ambulatory robot is provided with front legs and rear legs that are constituted so that the lengths from the origins of the front legs and the rear legs to their terminal portions can be varied. In walking, the front legs and the rear legs are rotated and the lengths of the front legs and the rear legs are changed so that the front legs are raised from the ground surface while the rear legs are maintained in contact with the ground. Then, the front legs and the rear legs are rotated and the lengths of the legs are changed so that the front legs raised from the ground surface are replaced on the ground in the direction of ambulation and the rear legs that were maintained in contact with the ground are raised from the ground surface. Then, the front legs and the rear legs rotate and the lengths of the legs change so that the rear legs so raised from the ground surface are replaced on the ground in the direction of ambulation. Control in this manner is repeated while maintaining the trunk in a substantially erect posture as the ambulatory robot walks.

13 Claims, 8 Drawing Sheets

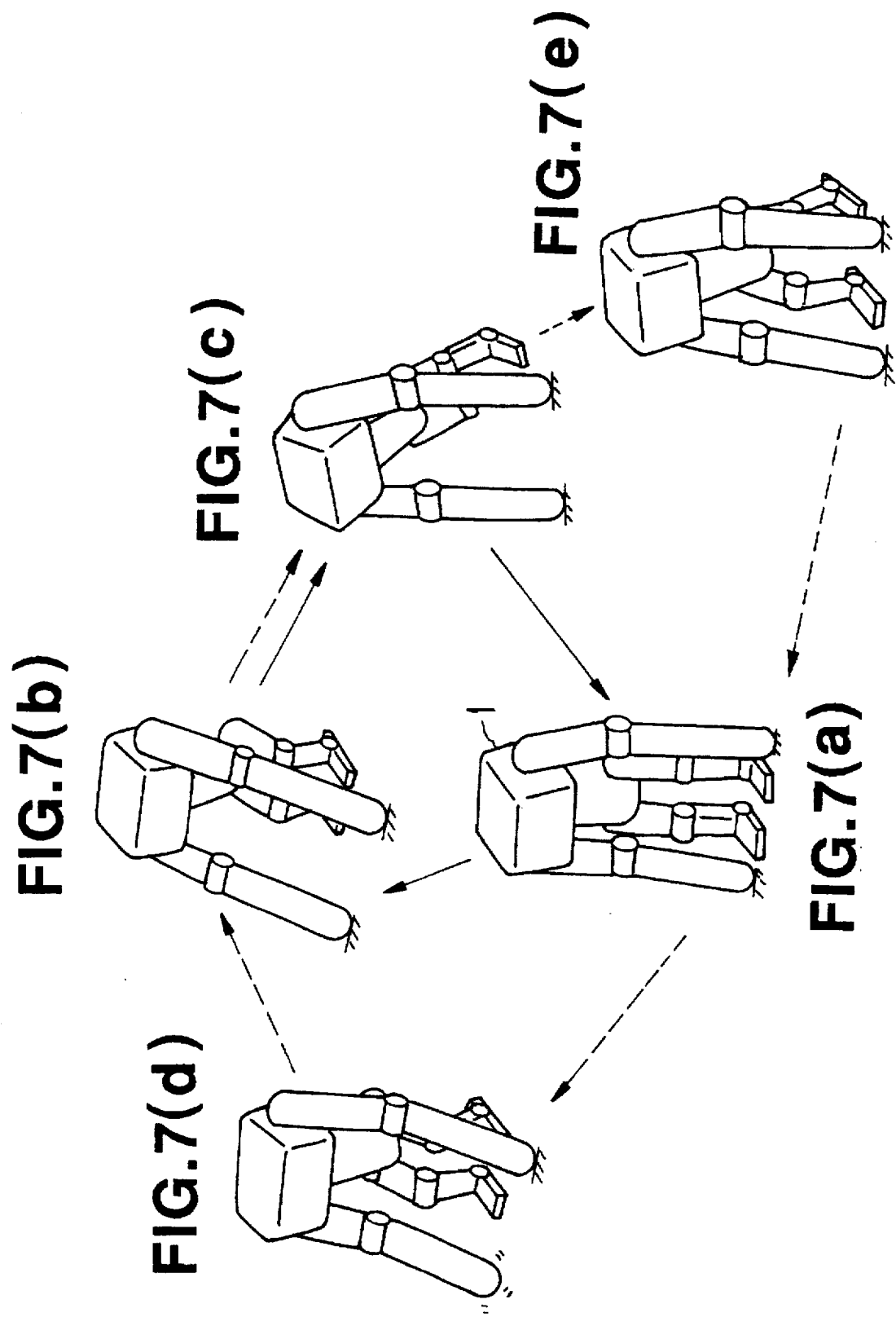

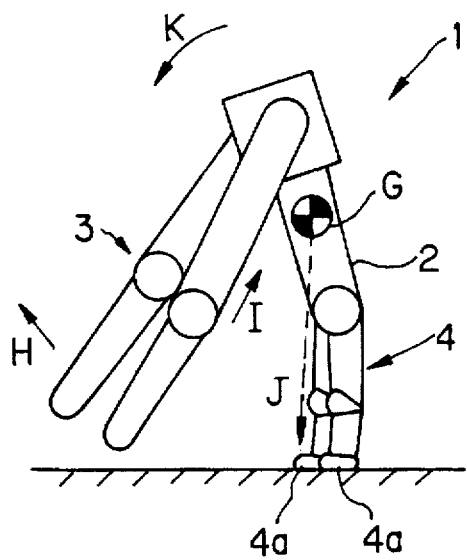
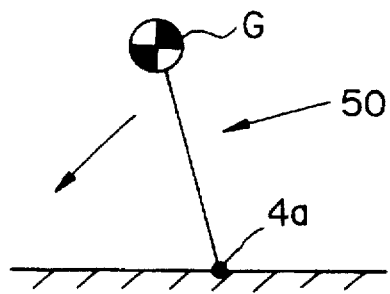
FIG.9(a)  FIG.9(b)
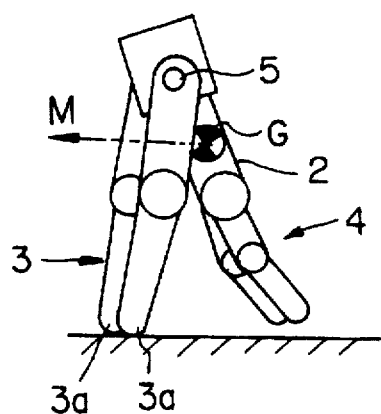
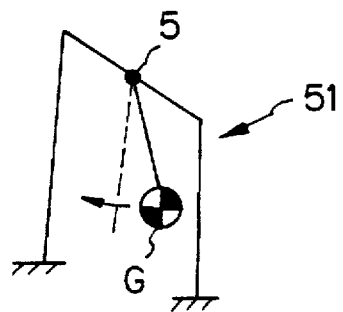
FIG.10(a)  FIG.10(b)

AMBULATORY ROBOT AND AMBULATION CONTROL METHOD FOR SAME

BACKGROUND OF THE INVENTION

1. Field of the Invention

The present invention relates in general to an ambulatory robot and an ambulation control method for the same, and in particular to an ambulatory robot capable of consistent dynamic ambulation with high energy efficiency, and a method for the same.

2. Description of the Related Art

As may be seen from Japanese Patent Publication 5-62363 and others, various types of ambulatory robots have been developed for performing tasks in environments which humans cannot enter, and patent applications have been made.

Conventional ambulatory robots include "bipedal ambulatory" robots that ambulate like humans, with two legs alternately coming into contact with the ground. Dynamic ambulation techniques which utilize the inertial energy accompanying motion are employed for such "bipedal ambulatory" robots.

Dynamic ambulation here refers to an ambulation control technology that utilizes pendulum motion produced by body swing and inertial motion based on kinetic energy produced during rapid body motion. This dynamic ambulation technology offers the advantage of minimal loss in energy required for motion during ambulation over a level road surface.

However, actual road surfaces, whether indoor or outdoor, are sometimes irregular, and these road surface irregularities make sustained pendulum motion difficult, in some cases resulting in the dynamic ambulatory robot stumbling over an irregular surface and falling over.

Such unstable ambulation is one reason why bipedal ambulatory robots have not been made practical.

Conventional ambulatory robots also include "multipedal ambulatory" robots that ambulate by alternately placing four or more legs in contact with the ground. Static ambulation techniques involving adjusting the location of the center of gravity to a stable position are employed for such "multipedal ambulatory" robots.

Static ambulation here refers to a technique whereby adjustments are made during the leg motion that accompanies movement so that a vertical line descending from the center of gravity of the body passes through the inside of a polygon connecting the points of ground contact of the three or more legs that are in contact with the ground during a slow ambulation process.

This static ambulation has the advantage that stable ambulation can be accomplished even on irregular road surfaces with simple control methods, but ambulation is made extremely slow to prevent inertial motion and pendulum motion on the part of the body from acting as destabilizing factors in ambulation, and this strategy has the disadvantage of entailing high losses in the energy required to produce movement, and poor efficiency.

Thus, there is a need for development of a robot that can move by means of highly efficient dynamic ambulation on level surfaces and that can move by means of highly stable static ambulation in areas with irregular terrain.

When the bottoms of the feet of a bipedal ambulatory robot are designed with a small footprint in order to produce efficient dynamic ambulation, the center of gravity of the body is susceptible to shifting forwards and backwards and right and left, making it difficult to deploy this same robot in a static ambulation mode.

Additionally, the length L1 of the front legs of conventional quadrupedal robots is generally equal to the length L2 of the back legs, with the length L3 of the trunk being of equal or greater length.

Thus, when ambulation is attempted while the maintaining the trunk (of length L3) erect, the terminal portions of the front legs do not reach the surface of the ground, with the result that the front legs are suspended off the ground.

When dynamic ambulation in an erect posture is attempted in this manner, bipedal ambulation employing only the two rear two legs is unavoidably unstable for reasons pertaining to robot structure.

Thus, robots that dynamically ambulate by bipedal ambulation experience unstable ambulation, and are not readily made practical.

It is moreover difficult to operate a given robot in both dynamic ambulation and static ambulation modes, and for structural reasons, bipedal ambulation by the rear two legs only is unavoidably unstable.

SUMMARY OF THE INVENTION

The present invention was developed with the foregoing in view. The first object of the present invention is to enable stable dynamic ambulation.

The second object of the present invention is to enable both dynamic ambulation and static ambulation on a single robot.

In order to achieve the first object, the first invention of the present invention makes provision of an ambulatory robot in which a plurality of front legs and a plurality of rear legs are installed rotatably with respect to the ambulatory robot trunk, the plurality of front legs and plurality of rear legs being constituted such that the length from the front leg and the rear leg origins to their terminal portions can be varied, comprising first control means for raising either the front legs or the rear legs from the surface of the ground in a state in which the other legs are maintained in contact with the ground, second control means for placing the legs so raised from the surface of the ground by the first control means onto the ground in the direction of ambulation and that raise the legs maintained in contact with the ground during the process of control by the first control means, and third control means for placing the legs so raised from the surface of the ground by the second control means onto the ground in the direction of ambulation, control by the first, second, and third control means being performed repeatedly as the front legs and rear legs are rotated and the length of these legs is changed so that the trunk is maintained in substantially erect posture as the ambulatory robot ambulates.

As depicted in FIG. 3, the first invention, so constituted, comprises ambulatory robot 1 front legs 3 and rear legs 4 whose lengths, L1 and L2 (measured from the front leg 3 and rear leg 4 origins 5 and 9 to their respective terminal portions 3a and 4a), can be varied. As a result, the robot can assume a posture in which the terminal portions 3a of the front legs 3 reach the ground while the trunk of length L3 is maintained in an erect posture.

As depicted in FIG. 9(a), the front legs 3 and the rear legs 4 rotate and the lengths of the legs 3 and 4 are changed so that the front legs 3 are raised from the surface of the ground in a state in which the rear legs 4 are maintained in contact with the ground.

As depicted in FIGS. 10(a) and 10(b), the front legs 3 and the rear legs 4 rotate and the lengths of the legs 3 and 4 are changed so that the legs 3 so raised from the ground surface are subsequently replaced on the ground in the direction of ambulation and legs 4 that had been maintained in contact with the ground are subsequently raised from the ground surface.

Next, as depicted in FIG. 7(a), the front legs 3 and the rear legs 4 are rotated and the lengths of the legs 3 and 4 are changed so that the legs 4 that have been raised from the ground surface in the foregoing manner are replaced on the ground in the direction of ambulation.

Control in this manner is repeated while maintaining the trunk 2 in a substantially erect posture as the ambulatory robot ambulates. Specifically, it entails dynamic ambulation whereby a plurality of front legs and a plurality of rear legs are alternately placed on the ground during ambulation while maintaining the trunk 3 in a substantially erect posture, making possible ambulation that is more stable than dynamic ambulation by conventional "bipedal ambulation" in which ambulation is accomplished by alternate placement of two legs on the ground.

In order to achieve the second object in the second invention, the ambulatory robot is an ambulatory robot that ambulates by static ambulation control, repeated in sequence for each of the legs, whereby, of the legs in contact with the ground, one leg is raised from the ground surface, after which the one leg is replaced on the ground in the direction of ambulation, and is constituted so as to switch between dynamic ambulation, effected by repetition of the first through third control processes, and static ambulation, effected by repetition of static ambulation control processes.

In the second invention, the ambulatory robot 1 comprises front legs 3 and rear legs 4 whose lengths, L1 and L2 (measured from the front leg 3 and rear leg 4 origins 5 and 9 to their terminal portions 3a and 4a), can be varied, and leg length and rotation can be freely controlled, making possible not only the dynamic ambulation described in the context of the first invention but also static ambulation by means of the static ambulation control depicted in FIGS. 8(a) through (d) (which is repeated in sequence for each of the legs 3R, 3L, 4R, and 4L) whereby, of the legs 3R, 3L, 4R, and 4L in contact with the ground, one leg 3R is raised from the ground surface, after which the leg 3R is replaced on the ground in the direction of ambulation. That is, switching between dynamic ambulation and static ambulation makes it possible to employ highly efficient dynamic ambulation on level surfaces and to employ highly stable static ambulation in areas with irregular terrain.

BRIEF DESCRIPTION OF THE DRAWINGS

FIGS. 7(a) through 7(e) are diagrams depicting changes in the posture of the ambulatory robot of the embodiment;

FIGS. 9(a) and 9(b) are diagrams depicting the dynamic ambulation process depicted in FIG. 6; and FIGS. 10(a) and 10(b) are diagrams depicting the dynamic ambulation process depicted in FIG. 6.

DESCRIPTION OF THE PREFERRED EMBODIMENTS

Figure 1:
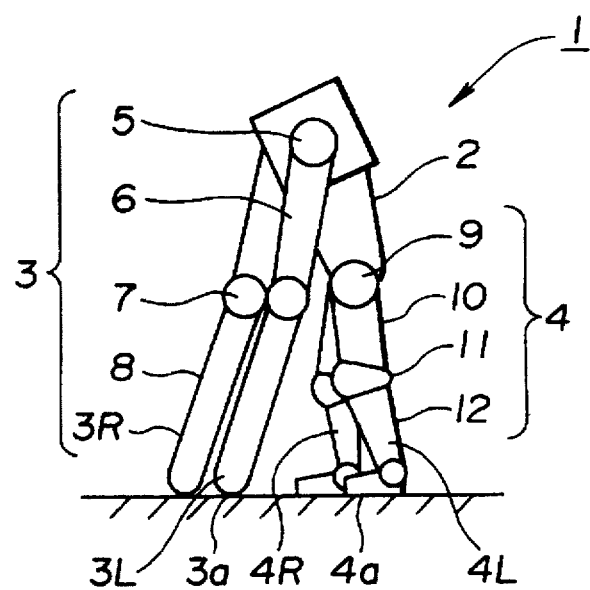
FIG. 1 is a side view depicting the side exterior of an ambulatory robot adapted as an embodiment of the present invention.

Embodiments of the ambulatory robot ambulation control apparatus and ambulation control method which pertain to the present invention will be described referring to the drawings.

FIG. 1 is a side view depicting the side exterior of the ambulatory robot 1 embodiment. As described below, this ambulatory robot 1 employs static ambulation to move over irregular terrain and employs dynamic ambulation to move over level terrain. As depicted in FIG. 1, the ambulatory robot 1 broadly comprises a trunk 2, two front legs 3 attached rotatably to this trunk 2, and two rear legs 4 similarly attached rotatably to the trunk 2. The shoulder joints 5 of the front legs 3 serve as their centers of rotation, permitting rotation within a prescribed angle range. The hip joints 9 of the rear legs 4 serve as their centers of rotation, permitting rotation within a prescribed angle range.

Figure 3:
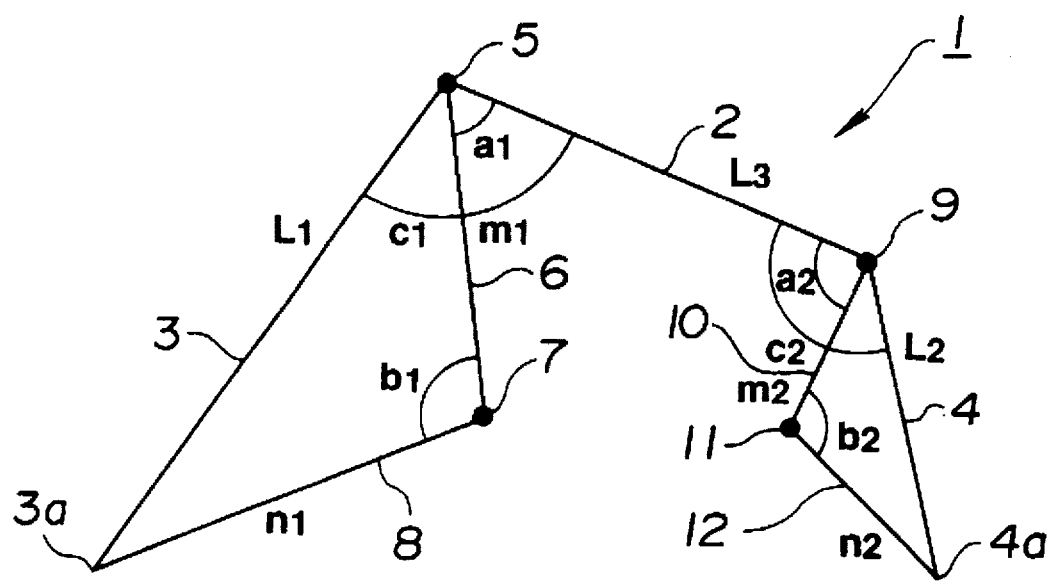
FIG. 3 is a diagram depicting geometric relationships between the components of the ambulatory robot of the embodiment.
Figure 4:
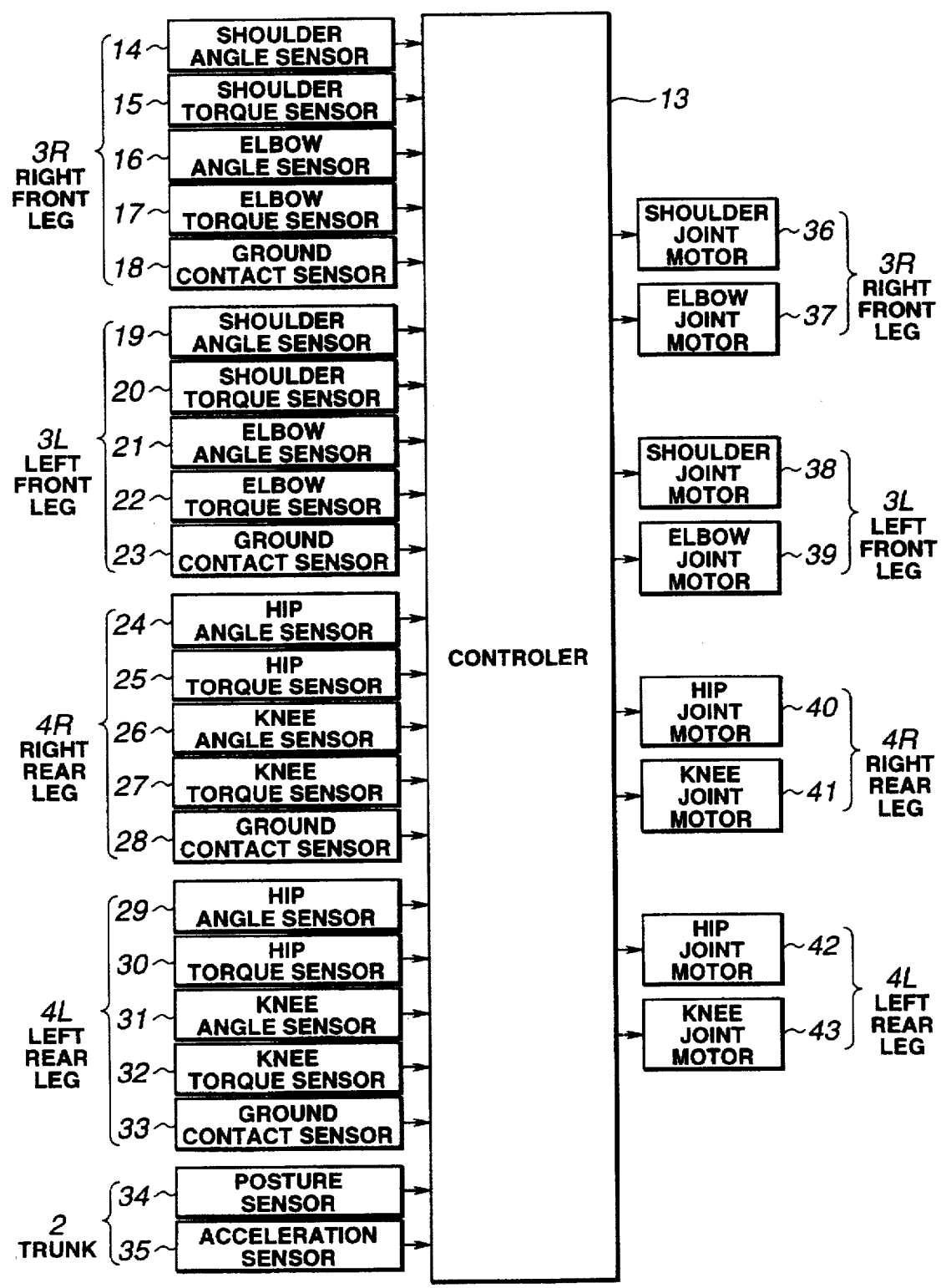
FIG. 4 is a block diagram depicting the constitution of the control apparatus of the embodiment.

FIG. 3 depicts geometric relationships in the body of the ambulatory robot of FIG. 1. FIG. 4 is a block diagram depicting the sensors, actuators, and controller that drives and controls the actuators provided to the ambulatory robot of FIG. 1.

As depicted in FIGS. 1, 3, and 4, each of the two front legs 3 is provided with a shoulder joint 5 and an elbow joint 7. The angles a1 and b1 of the respective joints 5 and 7 are adjusted by rotary actuators, for example, dc motors; the respective joint angles a1 and b1 are detected by sensors.

The areas between the shoulder joints 5 and the elbow joints 7 are furnished with mechanical constructions of rod form termed upper arm segments 6. Mechanical constructions of rod form termed forearm segments 8 are located forward of the elbow joints 7. These mechanical constructions of rod form need not be of exact linear, cylindrical, or other shape; the shape does not matter as long as the members have relatively long lengthwise extension relative to the diameter of their cross section. Curved shapes similar to human or monkey arms and legs are also possible. The linear distance from the origin of the upper arm segment 6 to the terminal portion is denoted m1; the equivalent distance over the forearm segments 8 is designated n1.

The following description takes the right front leg 3R as an illustration. A shoulder joint motor 36 is provided to the shoulder joint 5, and this motor 36 is driven by drive instruction signals that are output from the controller 13 in order to rotate the upper arm segment 6 to a prescribed angle a1 with respect to the trunk 2. Next, a shoulder angle sensor 14 provided to the shoulder joint 5 detects this angle a1, which is input in the form of a feedback signal to the controller 13 for use in control by the controller 13.

Similarly, an elbow joint motor 37 is provided to the elbow joint 7, and this motor 37 is driven by drive instruction signals that are output from the controller 13 in order to rotate the forearm segment 8 to a prescribed angle b1 with respect to the upper arm segment 6. Then, an elbow angle sensor 16 provided to the elbow joint 7 detects the angle b1, which is input in the form of a feedback signal to the controller 13 for use in control by the controller 13.

Motors employing hydraulic pressure as their motive source can be used in place of motors employing electricity as their motive source as the actuators for rotary drive of the joints. Rubber muscle actuators may also be used.

By changing the angles a1 and b1 of the shoulders and elbows using the actuators, the length of right front leg 3R, i.e., the linear distance, L1, from the shoulder joint 5 (the origin) to the foot (ground contact point) 3a can be varied.

The shoulder joint 5 is provided with a shoulder torque sensor 15 for sensing the torque (load) that is applied to the shoulder joint 5 and the elbow joint 7 is provided with an elbow torque sensor 17 for sensing the torque (load) that is applied to the elbow joint 7. The values detected by these torque sensors 15 and 17 are input to the controller 13 and utilized in the control process described subsequently. When dc motors are used as the motors for effecting joint rotation, torque (approximate values) can be detected by detecting the current passing through the motors. In this case, the provision of separate torque sensors 15 and 17 is unnecessary.

The terminal portion 3a of the forearm segment 8 is provided with a ground contact sensor 18 that detects contact of the right front leg 3R with the ground. The ground contact sensor 18 detects increments in the degree to which the body weight of the ambulatory robot 1 is placed on the ground surface; an analog or digital multi-output sensor may be used for this purpose. Alternatively, a two-value output sensor of an on-off type that simply detects the presence or absence of contact with the ground may be used.

The left front leg 3L is provided with a shoulder angle sensor 19, a shoulder torque sensor 20, an elbow angle sensor 21, an elbow torque sensor 22, a ground contact sensor 23, a shoulder joint motor 38, and an elbow joint motor 39 similar to the shoulder angle sensor 14, shoulder torque sensor 15, elbow angle sensor 16, elbow torque sensor 17, ground contact sensor 18, shoulder joint motor 36, and elbow joint motor 37 provided to the right front leg 3R.

The two rear legs 4 have a structure similar to that of the two front legs 3 described above, being provided with hip joints 9 and knee joints 11, with the angles a2 and b2 of the respective joints 9 and 11 being adjusted by rotary actuators similar to those employed in the front legs; the joint angles a2 and b2 are detected by sensors.

Specifically, the areas between the hip joints 9 and the knee joints 11 are furnished with mechanical constructions of rod form termed thigh segments 10, and mechanical constructions of rod form termed lower leg segments 12 are located forward of the knee joints 11. The linear distance from the hip joint 9 to the knee joint 1, i.e. the length of the thigh segment 10 is denoted m2; the equivalent distance for the lower leg segments 12 is designated n2.

The terminal portions 4a of the lower leg segments 12, i.e., the portions in contact with the surface of the ground, can be provided with shock absorption mechanisms, slip prevention mechanisms, mechanisms for kicking the ground surface, and the like.

The following description takes the right rear leg 4R as an illustration. A hip joint motor 40 is provided to the hip joint 9, and this motor 40 is driven by drive instruction signals output from the controller 13 in order to rotate the thigh segment 10 to a prescribed angle a2 with respect to the trunk 2. Then, a hip angle sensor 24 provided to the hip joint 9 detects the angle a2, which is input to the controller 13 in the form of a feedback signal for use in control by the controller 13.

Similarly, a knee joint motor 41 is provided to the knee joint 11, and this motor 41 is driven by drive instruction signals output from the controller 13 in order to rotate the lower leg segment 12 to a prescribed angle b2 with respect to the thigh segment 10. Then, a knee angle sensor 26 provided to the knee joint 11 detects the angle b2, which is input to the controller 13 in the form of a feedback signal for use in control by the controller 13.

By so changing the hip and knee angles a2 and b2 as necessary using the actuators, the length of right rear leg 4R, i.e., the linear distance L2 from the hip joint 9 (origin) to the foot (ground contact point) 4a, can be varied.

The maximum value of the linear distance L1 of the front legs 3 is denoted L1max and the minimum value of the linear distance L2 of the rear legs 4 is denoted L2min.

The ambulatory robot 1 should be designed to fulfill the relationship $$L1max > L2min + L3$$

where L3 denotes the length of the trunk 2, i.e., the distance between the shoulder joints 5 and the hip joints 9.

The hip joint 9 is provided with a hip torque sensor 25 for sensing the torque (load) applied to the hip joint 9; the knee joint 11 is provided with a knee torque sensor 27 for sensing the torque (load) applied to the knee joint 11. Values detected by these torque sensors 25 and 27 are input to the controller 13 and used in the control process described below.

The terminal portion 4a of the lower leg segment 12 is provided with a ground contact sensor 28 that detects contact of the right rear leg 4R with the ground.

The left rear leg 4L is provided with a hip angle sensor 29, a hip torque sensor 30, a knee angle sensor 31, a knee torque sensor 32, a ground contact sensor 33, a hip joint motor 42, and a knee joint motor 43 similar to the hip angle sensor 24, hip torque sensor 25, knee angle sensor 26, knee torque sensor 27, ground contact sensor 28, hip joint motor 40, and knee joint motor 41 provided to the right rear leg 4R.

Figure 2A:
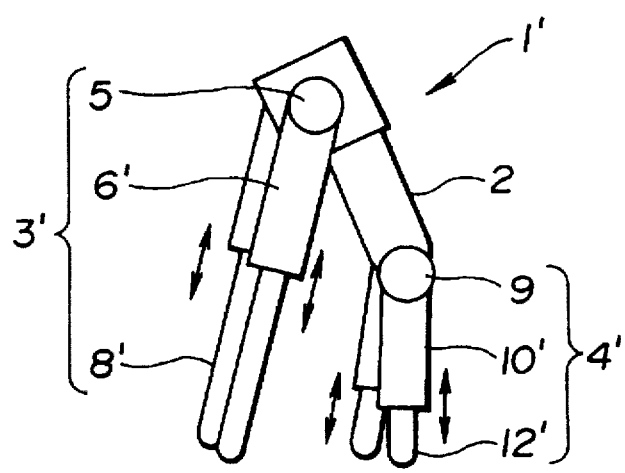
FIG. 2(a) is a side view depicting an example of modification of an ambulatory robot and 2(b) is a diagram depicting the relationship with the ambulatory robot of FIG. 1.

FIG. 2(a) depicts an ambulatory robot 1' provided with front legs 3' and rear legs 4' that differ in structure from those of the ambulatory robot 1 of FIG. 1.

The forearm segments 8' of the front legs 3' of the ambulatory robot 1' are installed in telescoping fashion with respect to the upper arm segments 6'; the lower leg segments 12' of the rear legs 4' are installed in telescoping fashion with respect to the thigh segments 10'.

In this structure, the front legs 3' and the rear legs 4' telescope in the direction indicated by the arrows so that the length L1 of the front legs 3' and the length L2 of the rear legs 4' can be changed, affording relationships equivalent to those of the bending-joint robot 1 depicted in FIG. 1.

Figure 2B:
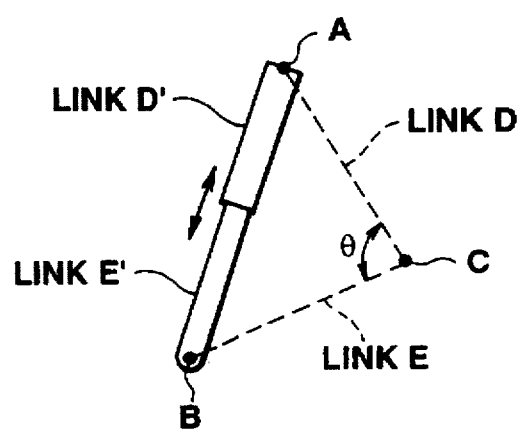

Specifically, FIG. 2(b) depicts geometric relationships in a leg having the structure depicted in FIG. 1 and in a leg with the structure depicted in FIG. 2(a). A leg with the structure depicted in FIG. 2(a), comprising a link D' fashioned from a hollow cylinder (upper arm segment 6', for example) and a link E' that inserts into this hollow (forearm segment 8', for example), is telescoped by means of an actuator, such as a hydraulic cylinder, and the telescoping operation changes the distance L1 (L2) between point A at the terminal portion of link D' and point B at the terminal portion of link E'. In contrast, a leg with the structure depicted in FIG. 1, comprising a link D (upper arm segment 6, for example) and a link E (forearm segment 8, for example), is rotated to angle by means of an actuator, such as a motor provided to the joint C (elbow joint 7, for example), to change the distance L1 (L2) between point A' and point B. Thus, both designs have equivalent relationships.

By way of further description, suppose c1 to denote the angle formed by a front leg 3 (the line connecting the points A and B) with respect to the trunk 2, as depicted in FIG. 3. This angle c1 can be expressed in terms of the angles of joint rotation, a1 and b1, the length, m1, of the upper arm segment 6, and the length, n1, of the forearm segment 8 as:

$$c1 = a1 + \tan^{-1}(n1 \cdot \sin(b1)/(m1 - n1 \cdot \cos(b1))) \quad (1)$$

The angle c2 of the rear legs 4 can be expressed as in equation 1 using the angles of joint rotation, a2 and b2, the length, m2, of the thigh segment 10, and length, n2, of the lower leg 12.

Using b1, m1, and n1, the length, L1, of the front leg 3 can be expressed as:

$$L1 = (m1^2 - 2m1 \cdot n1 \cdot \cos(b1) + n1^2)^{1/2} \quad (2)$$

The length, L2, of the rear leg 4 can also be expressed in the format of equation 1.

Substitution of either the front legs 3 or the rear legs 4 of the robot 1 depicted in FIG. 1 with legs having the structure depicted in FIGS. 2(a) and 2(b) is another permissible embodiment.

The trunk 2 is provided with posture sensors 34 for detecting successive angles of the trunk 2 and with acceleration sensors 35 for detecting changes in the speed of the trunk 2 (see FIG. 4).

Inertial navigation apparatus comprising a three-axis rate gyros and a three-axis accelerometer can be used as the position sensors 34 and acceleration sensors 35 of the trunk 2.

In this case, the three-axis rate gyro differs from a simple clinometer that merely detects in the direction of gravity in that it is able to accurately detect posture angle without being affected by accelerating or decelerating motion of the trunk 2, and can detect posture angles such as roll angle and pitch angle.

Accurate detection of posture angles of the trunk 2 of the robot 1 by such a three-axis rate gyro posture sensor 34 allows the gravitational acceleration influence component in data from the three-axis accelerometer due to inclination of the trunk 2 to be canceled so that acceleration of motion of the trunk 2 can be detected accurately.

Accurate detection of the posture angle of trunk 2 and of acceleration allows for accurate detection of the direction and speed of inverted pendulum downswing during control of dynamic ambulation, described below, and to accurately estimate the direction and timing with which a front leg 3 or rear leg 3 is replaced on the ground after this front leg or rear leg has been raised from the ground, thus permitting precise control of dynamic ambulation (see FIGS. 9(a) and 9(b), FIGS. 10(a) and 10(b)).

The specifics of the control process performed by the controller 13 of FIG. 4 will be described referring to the flowcharts of FIGS. 5 and 6 and to the drawings depicting operation in FIGS. 7 through 10. As noted above, the robots depicted in FIG. 1 and in FIG. 2(a) are of similar structure in that the lengths, L1 and L2, of the front legs and the rear legs can be varied, so the joint rotation robot 1 depicted in FIG. 1 shall be used as an example in the following discussion.

Figure 5:
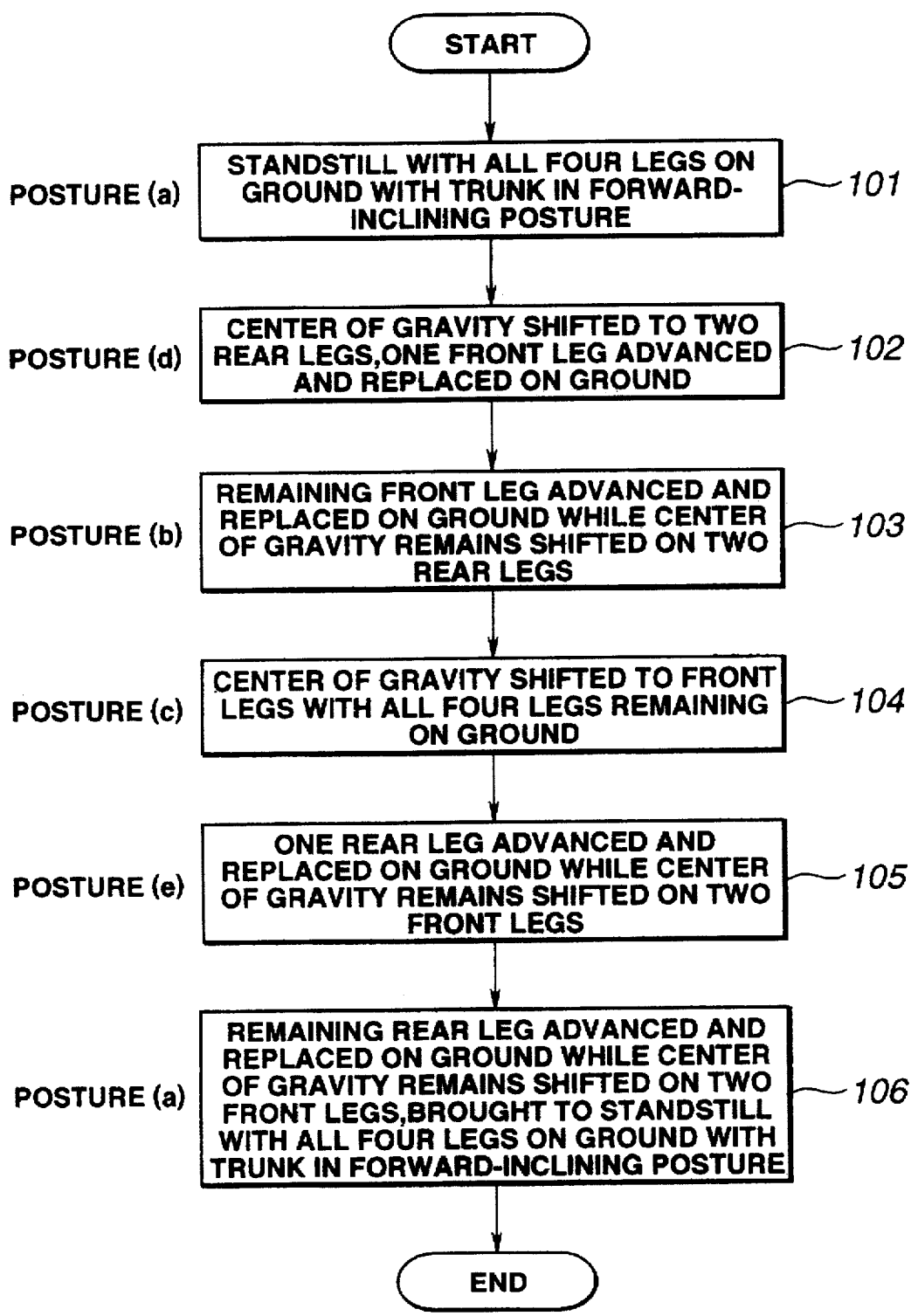
FIG. 5 is a flow chart depicting the process sequence for static ambulation control executed by the controller depicted in FIG. 4.

FIG. 5 depicts the process steps for static ambulation of the ambulatory robot 1, and the broken arrows in FIGS. 7(a) through 7(e) and FIGS. 8(a) through 8(d) depict changes in the posture of the robot 1 during static ambulation.

Specifically, one static ambulation operation cycle is depicted by FIGS. 7(a), 7(d), 7(b), 7(c), 7(e), 7(a). The posture of the robot 1 at each point in time afforded by drive-control of the aforementioned shoulder joint motors 36, elbow joint motors 37 . . . to change the lengths, L1 and L2, of the front legs 3 and rear legs 4 and to change the angles of rotation, c1 and c2, of the front legs 3 and rear legs 4 with respect to the trunk 2.

The static ambulation operation begins from the standstill state depicted in FIG. 7(a). In this state, the trunk 2 is in an almost erect, forward-inclining posture. Lengths L1 and L2 and angles c1 and c2 have been adjusted so that all four legs 3R, 3L, 4R, and 4L touch the ground (step 101).

When changing from the posture depicted in FIG. 7(a) to that of FIG. 7(d), the hip joints 9 and the knee joints 11 of the two rear legs 4 bend, slightly lowering the height of the trunk 2 so that most of the weight is shifted onto the rear legs 4. One of the front legs, 3R, is then raised from the ground so that the weight of the body of the robot 1 is supported by three-point support on the other front leg, 3L, and the two rear legs, 4R and 4L. During this time, the rotation of the front leg 3 and rear leg 4 joints 5, 7, 9, and 11 is controlled so that a vertical line through the center of gravity G of the robot 1 passes through the interior of a triangle having the aforementioned three support points as its apices (see FIG. 8(a)).

The raised front right leg 3R is replaced on the ground in the direction of forward progress and the four-point support posture depicted in FIG. 7(d) is assumed (step 102).

When changing from the four-point support posture depicted in FIG. 7(d) to that of FIG. 7(b), the hip joints 9 and the knee joints 11 of the two rear legs 4 again bend, slightly lowering the height of the trunk 2 so that most of the weight is shifted onto the rear legs 4. The remaining front leg 3L that is the next leg to be moved is then raised from the ground, and the weight of the body of the robot 1 is supported statically by three-point support on the other front leg 3R and the two rear legs 4R and 4L. During this time, the rotation of the front leg 3 and rear leg 4 joints 5, 7, 9, and 11 is controlled so that a vertical line through the center of gravity G of the robot 1 passes through the interior of a triangle having the aforementioned three support points as its apices (see FIG. 8(b)).

The raised front left leg 3L is replaced on the ground in the direction of forward progress and the four-point support posture depicted in FIG. 7(b) is assumed (step 103).

When changing from the posture depicted in FIG. 7(b) to that of FIG. 7(c), the four-point support posture is maintained as leg lengths L1 and L2 and angles c1 and c2 are adjusted so that the center of gravity G of the robot 1 is moved forward. Posture is changed slowly within a range allowing static stability to be maintained (step 104).

When changing from the four-point support posture depicted in FIG. 7(c) to that of FIG. 7(e), the shoulder joints 5 and the elbow joints 7 of the two front legs 3 bend, slightly raising the height of the trunk 2 so that the weight is largely shifted onto the front legs 3. Next, one of the rear legs 4R is raised from the ground, and the weight of the body of the robot 1 is supported statically by three-point support on the other rear leg 4L and the two front legs 3R and 3L. During this time, the rotation of the front leg 3 and rear leg 4 joints 5, 7, 9, and 11 is controlled so that a vertical line through the center of gravity G of the robot 1 passes through the interior of a triangle having the aforementioned three support points as its apices (see FIG. 8(c)).

The raised rear right leg 4R is replaced on the ground in the direction of forward progress and the four-point support posture depicted in FIG. 7(e) is assumed (step 105).

When changing from the four-point support posture depicted in FIG. 7(e) to that of FIG. 7(a), the shoulder joints 5 and the elbow joints 7 of the two front legs 3 again bend, slightly raising the height of the trunk 2 so that the weight is largely shifted onto on the front legs 3. Next, the remaining rear leg 4L that is the next leg to be moved is raised from the ground, and the weight of the body of the robot 1 is supported statically by three-point support on the other rear leg 4R and the two front legs 3R and 3L. During this time, rotation of the front leg 3 and rear leg 4 joints 5, 7, 9, and 11 is controlled so that a vertical line through the center of gravity G of the robot 1 passes through the interior of a triangle having the aforementioned three support points as its apices (see FIG. 8(d)).

The raised rear left leg 4L is replaced on the ground in the direction of forward progress and the four-point support posture depicted in FIG. 7(a) is assumed (step 106). Subsequently, steps 101 through 106 are executed repeatedly, allowing the ambulatory robot 1 to ambulate by static ambulation on irregular terrain. To stop the ambulatory robot 1, it is brought to a standstill in the initial posture (a) depicted in FIGS. 7(a) through 7(e).

Figure 6:
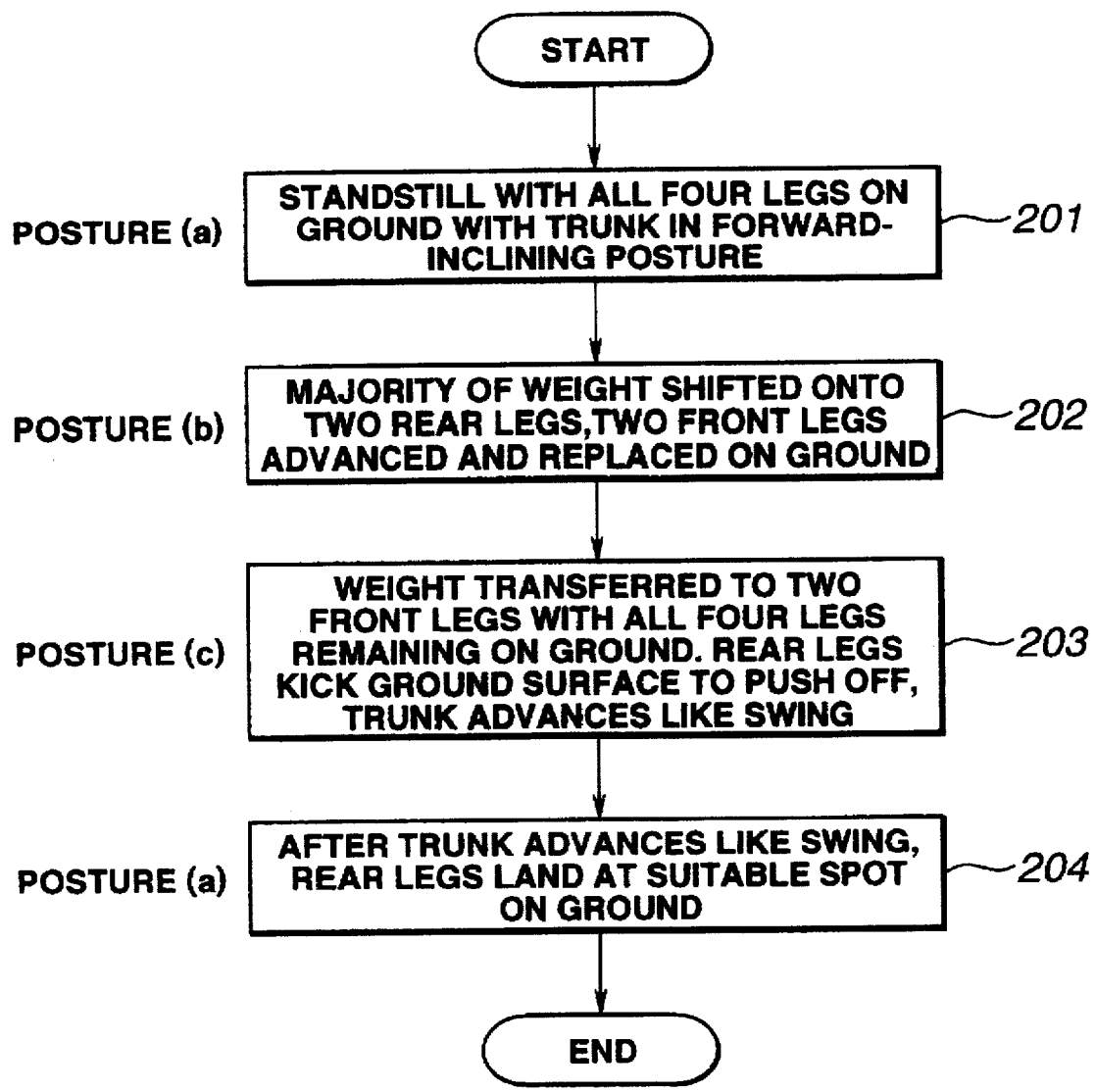
FIG. 6 is a flow chart depicting the process sequence for dynamic ambulation control executed by the controller depicted in FIG. 4.
Figure 8A:
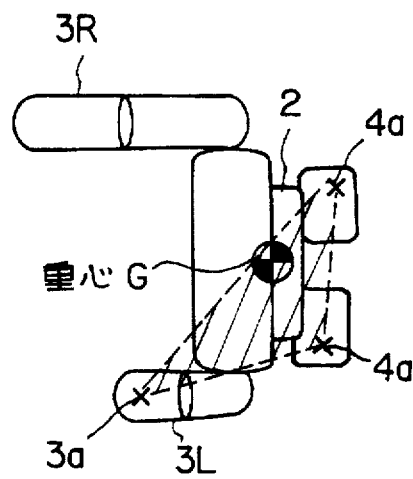
FIGS. 8(a) through 8(d) are diagrams depicting the static ambulation process depicted in FIG. 5.
Figure 8B:
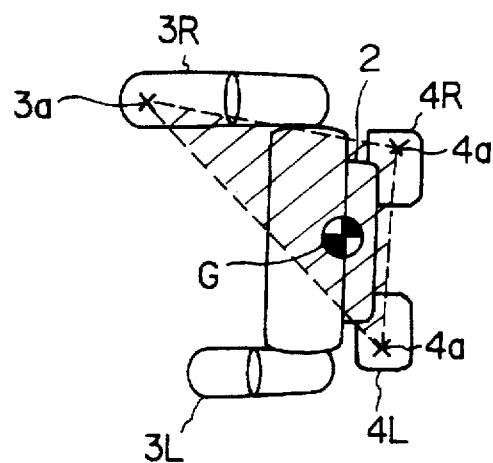
Figure 8C:
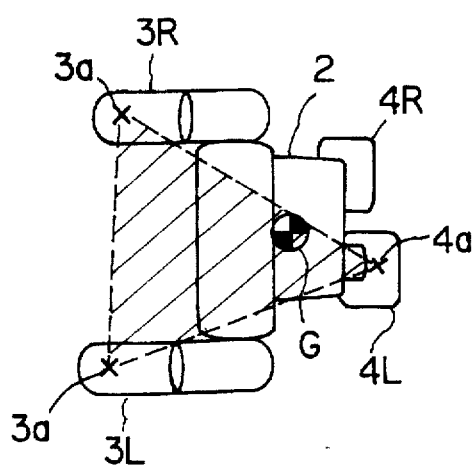
Figure 8D:
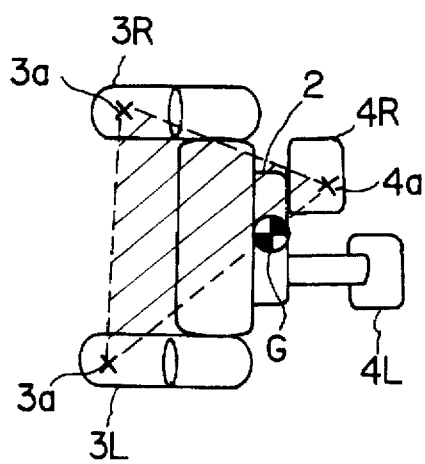

If flat terrain should be encountered during static ambulation mode (which offers good stability on irregular terrain), switchover to the process depicted in FIG. 6 is made to effect changeover to dynamic ambulation, which offers high energy efficiency.

FIG. 6 depicts the process steps for dynamic ambulation of the ambulatory robot 1. The solid arrows in FIGS. 7(a) through 7(e) together with FIGS 9(a) and 9(b) depict changes in robot 1 posture during dynamic ambulation.

Specifically, a single static ambulation operation cycle is depicted by FIGS. 7(a), 7(b), 7(c), 7(a). The posture of the robot 1 at each point in time is produced by drive-controlling the aforementioned shoulder joint motors 36, elbow joint motors 37 . . . to effect changes in the length L1 and L2 or the front legs 3 and rear legs 4 and to change the angle of rotation c1 and c2 of the front legs 3 and rear legs 4 with respect to the trunk 2.

As in step 101 of static ambulation, the dynamic ambulation operation also begins from the standstill state depicted in FIG. 7(a) (step 201).

First Control (Step 202)

When changing from the posture depicted in FIG. 7(a) to that of FIG. 7(b), the two rear leg 4 hip joint motors 40 and 42 and knee motors 41 and 43 are rotated, shortening the length of the rear legs 4. As a result, the center of gravity G moves backwards so that the majority of the weight is shifted onto the rear legs 4. This backward shift of the center of gravity G and concentration of weight on the rear legs 4 reduces the weight applied to the front legs 3 and reduces the torque applied to the shoulder joints 5 and the elbow joints 7. Thus, a sufficient backwards shift of the center of gravity G can be detected by the shoulder torque sensors 15 and 20 and the elbow torque sensors 17 and 22.

Thus, when it is detected, on the basis of front leg torque sensor detection values, that the majority of weight has been shifted onto the rear legs 4, the shoulder joint motors 36 and 38 and the elbow joint motors 37 and 39 are rotated, shortening the length L1 of front legs 3, and the hip joint motors 40 and 42 are rotated so that the trunk 2 rises in the erect direction (see FIG. 9(a)). As a result, the front legs 3 are raised from the ground, as depicted in FIG. 9(a) in a position, in which the center of gravity G, though moved backwards, is still somewhat forward of the ground contact points 4a of rear legs 4.

Second Control (Steps 202, 203)

Thereupon, the ambulatory robot 1 functions like an inverse pendulum 50 with the axis connecting the ground contact points 4a and 4a of the two rear legs 4 serving as the fulcrum axis of rotation, and begins to fall forward as depicted by the arrow K in FIG. 9(a) and by the arrow in FIG. 9(b). As indicated by arrow J, the center of gravity G of the robot 1 is almost directly above the fulcrums 4a and 4a of the inverse pendulum 50 so the speed of fall is sufficiently low.

Thus, after shortening the length L1 of front legs 3 as described above, the motors can be operated so as to swing the front legs forward as indicated by arrow H; the motors are operated so as to provide the time required to increase the length L1 of the front legs (see FIG. 9(a)).

The robot 1 continues to fall forward while the front legs 3 are extended in forward direction H, finally assuming the position depicted in FIG. 7(b) in which the front legs are in contact with the ground.

Contact of the front legs 3 with the ground is detected by the front leg 3 sensors 18 and 23. Contact with the ground can also be detected on the basis of output from the shoulder torque sensors 15 and 20 and the elbow torque sensors 17 and 22 (step 202).

The robot 1 continues its forward falling motion as the front legs 3 come into contact with the ground. This kinetic energy is utilized for efficient execution of the following operation. Specifically, without bringing the robot to a standstill with its front legs in contact with the ground as depicted in FIG. 7(b), the speed of forward motion of the center of gravity G is maintained as the following operation starts without interruption.

When changing from the posture depicted in FIG. 7(b) to that of FIG. 7(c), the center of gravity G moves forward in the manner described in step 104 of static ambulation. The point of difference with static ambulation is that kinetic energy (inertial energy) produced during the forward fall of the robot 1 is utilized in an inverse pendulum 50 that has the axis connecting the ground contact points 3a and 3a of the two front legs 3 as its fulcrum axis of rotation. At this time, the hip joint motors 40 and 42 and the knee joint motors 41 and 43 are rotated to increase the length L2 of the rear legs 4. As a result, the inverse pendulum 50 is easily righted so that the center of gravity G can be smoothly shifted forward.

This use of kinetic energy allows for energetic change from the posture of FIG. 7(b) to that of FIG. 7(c), enables most of the weight of the robot to be carried by the front legs 3 during posture change, and allows the rear legs 4 to be easily raised from the ground in the subsequent operation.

The forward shift of the center of gravity G so that most of the robot's weight is carried on the front legs 3 reduces the weight carried by the rear legs 4 and reduces the torque that is applied to the hip joints 9 and the knee joints 11. Thus, a sufficient required forward shift of the center of gravity G can be detected by the hip torque sensors 25 and 30 and by the knee torque sensors 27 and 32.

In this way, when it is detected, on the basis of rear leg torque sensor detection values, that the majority of weight is now carried by the front legs 3, the hip joint motors 40 and 42 and the knee joint motors 41 and 43 are rotated to shorten the length L2 of rear legs 4. As a result, the rear legs 4 are raised from the ground.

As depicted in FIG. 10(a), the weight of the ambulatory robot 1 is supported at this time by the two front legs 3 as the center of gravity G shifts in the forward direction M and as the rear legs 4 are raised from the ground. The shoulder joint motors 36 and 38 are rotated in such a way that the raised rear legs 4 are swung forwards, and the robot 1 begins to move in the fashion of a pendulum 51 that is suspended from a swing set frame, as depicted in FIG. 10(b).

If the robot has sufficient speed at the time that the rear legs 4 are raised, the rear legs 4 can be swung forward and moved towards the next ground contact point. In some cases, a rapid forward swing of the rear legs 4 can hinder forward motion of the robot 1, due to backward pull on the center of gravity G by the reaction force thus produced. In the event that the speed at which the robot 1 moves is too low, the rear legs 4 are first made to push off from the ground, the resulting reaction force providing preliminary acceleration for the forward motion of the robot 1.

In this way, the trunk 2 of the robot 1 moves in the forward direction M while describing an arc like that of a swing, with the axis 3a,3a that connects the left and right shoulder joints 5 as the fulcrum axis of rotation (step 203).

Third Control (step 204)

As depicted in FIG. 9(b), the entire robot 1 functions like an inverse pendulum 50, with a straight line connecting the contact points 3a and 3a of the two front legs 3 serving as the fulcrum axis of rotation. Since the center of gravity G of the robot 1 is located almost directly above the fulcrum of the inverse pendulum 50, the initial rate of fall is sufficiently low. The hip joint motors 40 and 42 and the knee joint motors 41 and 43 are rotated so as to shorten the length L2 of the rear legs 4; then the shoulder joint motors 36 and 38 are rotated so as to propel the trunk 2 in the forward direction while again rotating the hip joint motors 40 and 42 and the knee joint motors 41 and 43 in such a way that the time required to increase the length L2 of the rear legs is provided.

When the trunk 2 is propelled forward in this way and the rear legs 4 are extended, the robot falls in the forward direction or the backward direction so that the rear legs 4 of the robot 1 land on the ground forward or behind the front legs 3. FIG. 7(a) depicts the case when the rear legs 4 land behind the front legs 3; contact of the rear legs 4 with the ground can be detected by output from the hip torque sensors 25 and 30 and the knee torque sensors 27 and 32.

In this way, the four leg ground contact posture of FIG. 7(a) is reassumed; the process described above can subsequently be repeated, changing the posture as depicted in FIGS. 7 (b), 7(c), and 7(a), to continue dynamic ambulation. Dynamic ambulation can be halted in the posture depicted in FIG. 7(a) by bringing the four legs 3 and 4 to a standstill.

If the center of gravity G shifts at high speed, the rear legs 4 will land ahead of the front legs 3. In this event, after the rear legs 4 have landed ahead of the front legs 3 the shoulder joint motors 36 and 38 and the elbow joint motors 37 and 39 are rotated so as to extend the length L1 of the front legs, thus righting the inverse pendulum 50, with the axis connecting the ground contact points 4a and 4a of the two rear legs 4 as the fulcrum axis of rotation. With most of the weight now carried on the rear legs 4, the shoulder joint motors 36 and 38 and the elbow joint motors 37 and 39 are rotated so as to shorten the length L1 of the front legs 3, whereupon the front legs 3 can be raised from the ground. Next, by a procedure similar to the change from the posture depicted in FIG. 7(a) that in FIG. 7(b), the shoulder joint motors 36 and 38 and the elbow joint motors 37 and 39 are rotated so as to extend the length L1 of the front legs 3, and the shoulder joint motors 36 and 38 are then rotated so as to swing the front legs 3 forwards to assume the posture depicted in FIG. 7(a).

If the terrain becomes uneven during dynamic ambulation mode, a switchover to the aforementioned process depicted in FIG. 5 is made, and the robot subsequently proceeds by static ambulation.

In this embodiment, a robot with two front legs and two rear legs was described, but three or more front legs and/or rear legs may be provided.

The robot pertaining to the present invention can be operated by manned or unmanned operation. Switchover between manned and unmanned operation is also possible.

In the case of manned operation, a driver's seat may be provided, for example, in the interior of the robot trunk.

As noted above, the robot pertaining to the present invention assumes operations performed in environments unsuited for human entry. Thus, the ends of the front legs or the sides of the front legs may be provided, for example, with work devices such as manipulator fingers or buckets so that while the robot is in a standstill position with only its rear legs in contact with the ground, its free front legs can be operated so that the aforementioned fingers are used to grasp objects or so that the aforementioned buckets are used for excavation. Deployment of the front legs is not limited to such operations; they may be provided with cameras or the like so that surrounding conditions can be photographed. Thus, potential applications for the robot pertaining to the invention are not limited.

As noted above, the present invention involves dynamic quadrupedal ambulation effected by alternate contact of a set of front legs and a set of rear legs, rather than dynamic ambulation by bipedal ambulation, with the result that dynamic ambulation is rendered stable, and progress towards the development of a practical dynamic ambulatory robot is made.

As noted above, the present invention involves dynamic quadrupedal ambulation effected by alternate contact of a set of front legs and a set of rear legs, rather than dynamic ambulation by bipedal ambulation, so a single robot can be operated in both dynamic ambulation and static ambulation modes. As a result, the optimal ambulation method can be selected in areas with varied terrain, and operational efficiency can be greatly improved.

What is claimed is:

1. A robot ambulation control method for a robot comprising a trunk, a plurality of front legs and a plurality of rear legs installed rotatably with respect to the trunk, the front legs and rear legs each having an origin, a terminal portion and a variable length from the origin to the terminal portion, wherein the method comprises:

a first control step of raising either the front legs or the rear legs from the the ground with the other legs maintained in contact with the ground when the ambulatory robot is ambulated;

a second control step of replacing on the ground advanced in the direction of ambulation the raised legs and of raising the legs maintained in contact with the ground during the first control step; and a third control step of placing on the ground, advanced in the direction of ambulation the legs raised from the surface of the ground in the second control step;

wherein the front legs and rear legs are rotated in such manner that, and the length of the legs is varied so that the trunk is maintained with a substantially erect posture as the ambulatory robot ambulates.

2. An ambulatory robot having a direction of intended forward progress and comprising:
   a) a center of gravity;
   b) an erect trunk;
   c) a plurality of ground-contacting front legs installed rotatably with respect to the trunk;
   d) a plurality of rear legs installed rotatably with respect to the trunk, each said front leg and each said rear leg having an origin, a terminal portion and a length from the origin to the terminal portion, the length of each leg being variable;
   e) first control means to:
      i) rotate the rear legs to shift the center of gravity of the trunk backwardly and hold the rear legs in contact with the ground at rear leg ground contact points; and
      ii) then rotate the front legs to raise the front legs from the ground in a position where a vertical line through the center of gravity is in the vicinity of the rear leg ground contact points;
   f) second control means to:
      i) rotate the front legs to be placed on the ground at front leg ground contact points, advanced in the direction of forward progress, while the center of gravity falls forwardly about a fulcrum provided by the rear leg ground contact points; and
      ii) then rotate the rear legs to be raised from the ground while the center of gravity of the trunk shifts further forward about a fulcrum of rotation provided by the front leg ground contact points; and
   g) third control means to place the raised rear legs onto the ground in the direction of forward progress;
the control movements effected by the first, second, and third control means being performed repeatedly in sequence, while the trunk is maintained with a substantially erect posture as the ambulatory robot ambulates.

3. An ambulatory robot according to claim 2 wherein the front legs are mounted to the trunk at a position vertically above the rear legs and are longer than the rear legs when both front and rear legs are in ground-contacting positions, with the trunk upright.

4. An ambulatory robot according to claim 3 wherein the front legs are mounted to the trunk outwardly of the rear legs and depend downwardly from the trunk, whereby the rear legs can be accommodated between the front legs, when suitably rotated.

5. An ambulatory robot according to claim 4 wherein the third control means extends the length of the front legs in response to the rear legs landing ahead of the front legs.

6. An ambulatory robot according to claim 2 wherein the second control means operates to lengthen the rear legs as they are rotated, while the center of gravity moves forward.

7. An ambulatory robot according to claim 2 comprising a pair of front legs and a pair of rear legs, the first, second and third control means being operative to rotate the legs of each pair in unison.

8. An ambulatory robot according to claim 2 comprising trunk posture sensors to detect successive angles of the trunk and acceleration sensors for detecting changes in the speed of the trunk.

9. An ambulatory robot according to claim 8 wherein the trunk posture sensors are three-axis posture sensors capable of detecting posture independently of trunk acceleration, the acceleration sensors are three-axis sensors, and trunk acceleration is determined independently of gravitational influences due to trunk inclination.

10. An ambulatory robot having a direction of intended forward progress and comprising;
    a) a center of gravity;
    b) an erect trunk having shoulder joints for a set of front legs and hip joints for a set of rear legs, the shoulder joints being spaced above the hip joints;
    c) a set of ground-contacting front legs rotatably mounted to the shoulder joints;
    d) a set of ground-contacting rear legs rotatably mounted to the hip joints, each said front leg and each said rear leg being extendible to have a variable leg length between an origin at the trunk and a terminal ground-contacting portion wherein the maximum length of the front legs is greater than the sum of the minimum length of the rear legs and the distance between the shoulder joints and the hip joints whereby the front legs can contact the ground in an out-of-vertical position; and
    e) control means to rotate and extend or retract the legs of each set, in unison as between the members of the set, and perform dynamic ambulation in the direction of forward progress on a level surface;
wherein, in said dynamic ambulation, each set of legs alternately and repeatedly is placed in load-bearing contact with the ground, raised from the ground, advanced in the direction of progress, and replaced in load-bearing contact with the ground, and wherein the trunk is swung back and forth along the direction of progress during said dynamic ambulation.

11. An ambulatory robot according to claim 10 wherein the front legs are mounted to the trunk outwardly of the rear legs and depend downwardly from the trunk, whereby the rear legs can be accommodated between the front legs, when suitably rotated.

12. An ambulatory robot according to claim 11 wherein the control means is operable so that the robot swings forwardly in the direction of progress about a fulcrum provided by ground contact of the front legs, the rear legs being raised from the ground.

13. An ambulatory robot according to claim 10 having ground surface condition sensors to detect whether ground condition is even or irregular, wherein the control means is operable in response to sensed ground condition to cause the robot to perform static ambulation on irregular ground and dynamic ambulation on even ground.

* * * * *